US008744481B2

(12) United States Patent
Baldemair et al.

(10) Patent No.: US 8,744,481 B2
(45) Date of Patent: Jun. 3, 2014

(54) METHOD FOR PROVIDING GEOGRAPHICAL POSITION RELATED INFORMATION IN A WIRELESS NETWORK

(75) Inventors: Robert Baldemair, Solna (SE); Martin Israelsson, Spånga (SE); Dirk Gerstenberger, Stockholm (DE); Muhammad Kazmi, Bromma (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 576 days.

(21) Appl. No.: 12/993,767

(22) PCT Filed: Jun. 24, 2008

(86) PCT No.: PCT/SE2008/050751
§ 371 (c)(1),
(2), (4) Date: Nov. 19, 2010

(87) PCT Pub. No.: WO2009/157822
PCT Pub. Date: Dec. 30, 2009

(65) Prior Publication Data
US 2011/0065453 A1    Mar. 17, 2011

(51) Int. Cl.
*H04W 24/00* (2009.01)
(52) U.S. Cl.
USPC .......... 455/456.1; 455/456.2; 455/456.3; 455/456.4; 455/456.6; 455/457
(58) Field of Classification Search
USPC .......... 455/404.2, 566, 456.1–456.6, 457; 340/988–996
See application file for complete search history.

(56) References Cited

U.S. PATENT DOCUMENTS 6,522,296 B2 *   2/2003   Holt ........................ 342/453
7,277,050 B2 * 10/2007   Ikeda ...................... 342/357.43
(Continued)

FOREIGN PATENT DOCUMENTS

WO   WO 2004/004372 A1   1/2004
WO   WO 2005/051034 A1   6/2005

OTHER PUBLICATIONS

International Search Report, PCT International Application No. PCT/SE2008/050751, Mar. 13, 2009.
(Continued)

*Primary Examiner* — Olumide T Ajibade Akonai
(74) *Attorney, Agent, or Firm* — Myers Bigel Sibley & Sajovec PA

(57) ABSTRACT

Method and arrangement in a first node for providing geographical position related information. The first node and a second node are comprised within a wireless communication system. The first node and the second node are adapted to exchange wireless signals. The method comprises receiving a signal from the second node. Apart of the received signal that has propagated through a first channel path from the second node is detected by using a circular correlator. A timing estimate associated with the propagation time of the part of the signal which is received over the first channel path from the second node is calculated. Thus the calculated timing estimate is provided, which timing estimate is to be used when determining the geographical position.

18 Claims, 8 Drawing Sheets

(56) References Cited

U.S. PATENT DOCUMENTS

| | | | |
|---|---|---|---|
| 7,646,330 B2 * | 1/2010 | Karr ............................... | 342/44 |
| 7,880,673 B2 * | 2/2011 | Hoshino et al. .......... | 342/357.49 |
| 7,917,155 B2 * | 3/2011 | Karr et al. .................. | 455/456.1 |
| 8,331,953 B2 * | 12/2012 | Carlson et al. ............. | 455/456.1 |
| 2002/0067307 A1 | 6/2002 | Lin et al. | |
| 2004/0033808 A1 * | 2/2004 | Rorabaugh ................ | 455/456.1 |
| 2004/0239558 A1 * | 12/2004 | Geier et al. ............. | 342/357.06 |
| 2006/0089153 A1 | 4/2006 | Sheynblat | |
| 2007/0077935 A1 | 4/2007 | Kloppel et al. | |
| 2008/0102859 A1 | 5/2008 | Karr et al. | |

OTHER PUBLICATIONS

3rd Generation Partnership Project; Technical Specification Group Radio Access Network; Physical layer—Measurements (FDD) (Release 7), 3GPP TS 25.215 V7.4.0, Nov. 2007, 20 pages.

3rd Generation Partnership Project; Technical Specification Group Radio Access Network; Evolved Universal Terrestrial Radio Access (E-UTRA); Physical Channels and Modulation (Release 8), 3GPP TS 36.211 V8.1.0, Nov. 2007, 54 pages.

Chinese Office Action Corresponding to Chinese Patent Application No. 200880130117.4 Date Mailed: Nov. 21, 2013; Foreign Text, 6 Pages, English Translation Thereof, 3 Pages.

* cited by examiner

METHOD FOR PROVIDING GEOGRAPHICAL POSITION RELATED INFORMATION IN A WIRELESS NETWORK

CROSS REFERENCE TO RELATED APPLICATION

This application is a 35 U.S.C. §371 national stage application of PCT International Application No. PCT/SE2008/050751, filed on 24 Jun. 2008, the disclosure and content of which is incorporated by reference herein in its entirety. The above-referenced PCT International Application was published in the English language as International Publication No. WO 2009/157822 A1 on 30 Dec. 2009.

TECHNICAL FIELD

The present invention relates to a method and arrangement in a first node. More particularly the present invention relates to an improved mechanism for obtaining timing estimates in wireless communications systems.

BACKGROUND

Currently, standardized and commercially deployed radio access technologies are proliferated. Such radio access technologies include the Global System for Mobile communications (GSM), Enhanced Data Rates for GSM Evolution (EDGE), General Packet Radio System (GPRS), Wide-band Code Division Multiple Access (WCDMA), Long Term Evolution (LTE) systems, Wireless Local Area Networks (WLAN), CDMA 2000 and others.

Positioning in wireless communication systems comprising these or other technologies can be performed in many different ways. A typical approach is that a request for positioning is provided. If the positioning information is not already available, some kind of measurement may be performed, and positioning data may be reported to a node responsible for the actual positioning.

Fingerprinting positioning algorithms operate by creating a radio fingerprint for each point of a fine coordinate grid that covers the Radio Access Network. The fingerprint may e.g. comprise the cell IDs that are detected by the terminal, in each grid point, or quantized path loss or signal strength measurements, with respect to multiple radio base stations, performed by the terminal, in each grid point.

Whenever a position request arrives to the positioning method, a radio fingerprint may be computed, based on various parameters which needs to be measured. Thereafter the corresponding grid point is looked up and reported. This requires that the point is unique. A major problem with this approach is that extensive surveying needs to be performed when the fingerprinting database is created. Nevertheless, a possible approach for generating fingerprinted positions may be to perform an extensive surveying operation that performs fingerprinting radio measurements repeatedly for all coordinate grid points of the Radio Access Network. This approach comprise however the disadvantage of becoming substantial, also for small cellular networks. Further, the radio fingerprints are in some instants e.g. signal strength and path loss, sensitive to the orientation of the terminal, a fact that is particularly troublesome for handheld terminals. For fine grids, the accuracies of the fingerprinted positions therefore become highly uncertain.

Further, certain approaches for generating fingerprinted positions may result in positioning data that does not comply with the available standards of today. Updating of different standards is a time-consuming and complex task and the request for using the new positioning methods as soon as possible rushes the implementation of the improvements. A general problem is thus that in order to allow for implementation of different improved positioning methods, reporting of positioning data has to be performed according to new manufacturer-specific non-standard protocols, which in turn limits the use to systems where all parts are provided by the same manufacturer.

Further, there is no measurements defined in LTE that specifically target positioning. As modulation schemes and sequences used in LTE are different from WCDMA, the measurement and positioning procedures used in WCDMA could not be used in LTE.

SUMMARY

It is therefore an object of the present invention to provide an improved mechanism in a wireless communication system for obtaining timing estimates.

According to a first aspect, the object is achieved by a method in a first node for providing geographical position related information. The first node and a second node are comprised within a wireless communication system. The first node and the second node are adapted to exchange wireless signals. The method comprises receiving a signal from the second node. A part of the received signal, that has propagated through a first channel path from the second node is detected by using a circular correlator. A timing estimate associated with the propagation time of the part of the signal which is received over the first channel path from the second node is calculated. Thus the calculated timing estimate is provided, which timing estimate is to be used when determining the geographical position.

According to a second aspect, the object is also achieved by an arrangement in a first node. The arrangement is configured to provide geographical position related information. The first node and a second node are comprised within a wireless communication system. The first node and a second node are also adapted to exchange wireless signals. The arrangement comprises a receiving unit. The receiving unit is adapted to receive a signal from the second node. The arrangement also comprises a detecting unit. The detecting unit is adapted to use a circular correlator to detect a part of the received signal that has propagated through a first channel path from the second node. Further, the arrangement comprises a calculation unit. The calculation unit is adapted to calculate a timing estimate associated with the propagation time of the part of the signal which is received over the first channel path from the second node. In addition, the arrangement furthermore comprises a providing unit. The providing unit is adapted to provide the calculated timing estimate, to be used when determining the geographical position of the second node.

Thanks to the use of a circular correlator when calculating timing estimates for signals with good or ideal periodic Auto-Correlation Function (ACF) a precise time measurement is obtained. The precise time measurement may be used for generating an appropriate and unique Evolved Universal Terrestrial Radio Access Network, E-UTRAN, radio fingerprint with a minimum of overhead signalling involved. Thus an improved mechanism for obtaining timing estimates is provided.

By using circular correlator, the periodic ACF rather than the a-periodic ACF is calculated which has lower side-lobe and a narrower main-lobe. These properties lead to an increased accuracy of the obtained timing estimates.

BRIEF DESCRIPTION OF THE DRAWINGS

The present invention will now be described more in detail in relation to the enclosed drawings, in which.

DETAILED DESCRIPTION

The invention is defined as a method and an arrangement in a positioning node and as a method and an arrangement in a user equipment, which may be put into practice in the embodiments described below. This invention may, however, be embodied in many different forms and should not be considered as limited to the embodiments set forth herein; rather, these embodiments are provided so that this disclosure will be thorough and complete, and will fully convey the scope of the invention to those skilled in the art. It should be understood that there is no intent to limit the present method and arrangement in a positioning node and the method and arrangement in a user equipment to any of the particular forms disclosed, but on the contrary, the present method and arrangement in a positioning node and the present method and arrangement in a user equipment is to cover all modifications, equivalents, and alternatives falling within the scope of the invention as defined by the claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1:
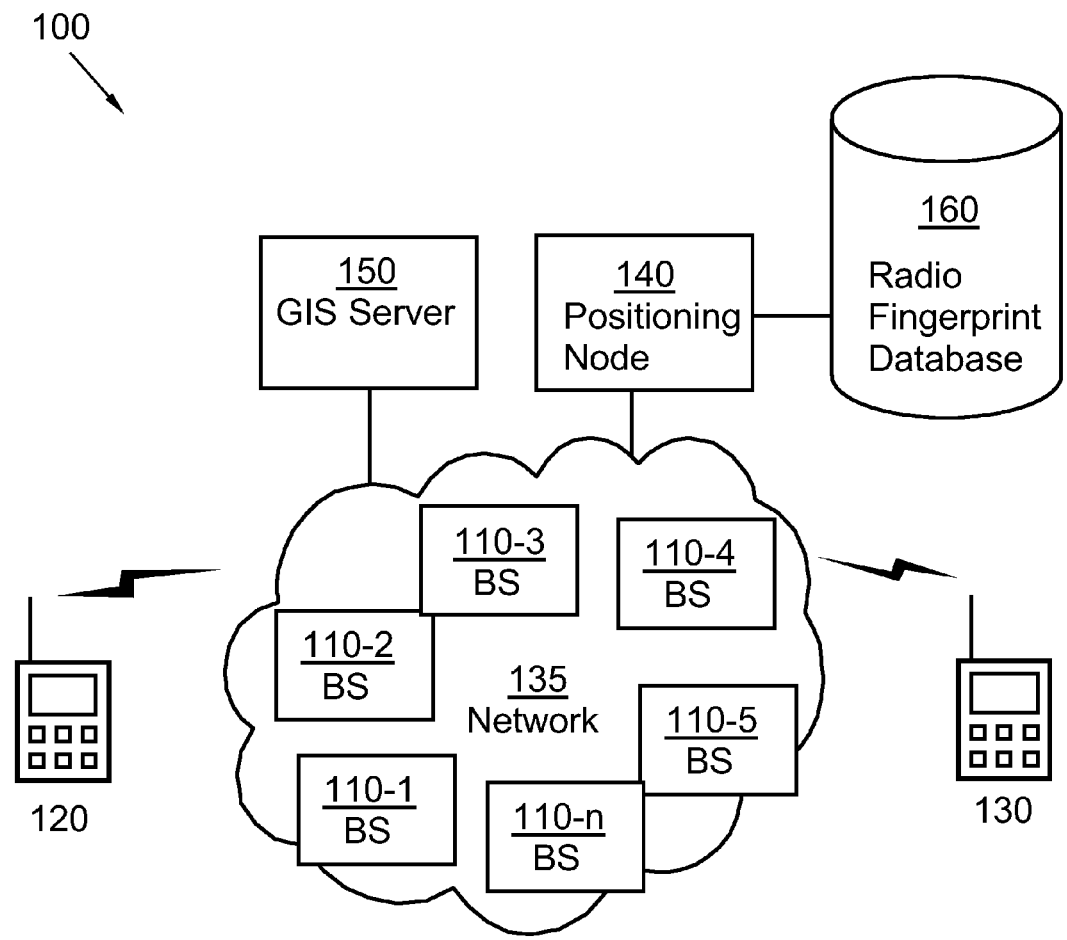
FIG. 1 is a schematic block diagram illustrating a wireless communication system according to some embodiments.

FIG. 1 is a schematic block diagram illustrating an exemplary wireless communication system 100, according to some embodiments. The wireless communication system 100 comprises a first node 110, a second node 120, 130, a positioning node 140 and a Geographic Information System (GIS) server 150 connected to a network 135.

The first node 110 may also be referred to as e.g. a base station, an access point, a Node B, an evolved Node B (eNode B) and/or a base transceiver station, Access Point Base Station, base station router, etc depending e.g. of the radio access technology and terminology used. In the rest of the description, the term "base station" will be used for the first node 110, in order to facilitate the comprehension of the present methods and arrangements.

The second node 120, 130 may be represented by e.g. a user equipment, a wireless communication terminal, a mobile cellular telephone, a Personal Communications Systems terminal, a Personal Digital Assistant (PDA), a laptop, a computer or any other kind of device capable of managing radio resources may communicate wirelessly with the base station 110 within the network 135. A Personal Communication System terminal may combine a cellular radiotelephone with data processing, facsimile and data communications capabilities. A PDA may comprise a radiotelephone, a pager, an Internet/intranet access device, a web browser, an organizer, calendars and/or a global positioning system (GPS) receiver. One or more of the second node 120, 130 may be referred to as a "pervasive computing" device. In some implementations, the second node 120, 130 may be represented by a telephone that is connected to a Public Switched Telephone Network. However, in the rest of the description, the term "user equipment" will consistently be used for the second node 120, 130 in order to facilitate the comprehension of the present methods and arrangements.

The user equipment 120 may communicate with another user equipment 130, or with other devices not shown, via the network 135 in the wireless communication system 100.

In one implementation, the user equipment 120 may communicate with the user equipment 130 via one or more other nodes that act as intermediate devices between user equipment 120 and user equipment 130. For example, as shown in FIG. 1, a base station 110-1, which may include wireless base station functionality, may reside as an intermediate component of the network 135 that may be used to facilitate end-to-end communication between the user equipments 120 and 130 or between the user equipments 120, 130 and the positioning node 140 or GIS server 150. Additional base stations 110-2 through 110-n may be comprised within the network 135.

The base stations 110-1 through 110-n may interface with respective user equipments 120, 130, e.g., base station 110-1 may interface with user equipment 120, via respective wireless links and may perform, among other functions, Medium Access Control (MAC) and Radio Link Control (RLC).

The positioning node 140 may determine the location of user equipments 120, 130 in the wireless communication system 100. The positioning node 140 may be associated with a radio fingerprint database 160 that stores radio fingerprints derived from Evolved Universal Terrestrial Radio Access Network (E-UTRAN) and/or inter-Radio Access Technology (IRAT) measurement data. The database 160 may reside internal or external to the positioning node 140. Alternatively, according to some embodiments, the database 160 may be remotely connected to the positioning node 140. The E-UTRAN and/or IRAT measurement data may be provided to the positioning node 140, in conjunction with precise geographic position data obtained at the same geographic location at which the E-UTRAN and/or IRAT measurements were performed, e.g., GPS geographic position data. Also, the positioning node 140 may organize the precise geographic position data into clusters having a same or similar radio fingerprint. The positioning node 140 may further determine the cluster boundaries of each cluster and store the cluster boundary information, associated radio fingerprints, and precise geographic position data in the radio fingerprint database 160. The positioning node 140 may subsequently receive E-UTRAN and/or IRAT radio fingerprint measurement data from the user equipment 120 and/or user equipment 130 and may perform a lookup into the radio fingerprint database 160 to identify a radio fingerprint stored in the database 160 that matches the received E-UTRAN and/or IRAT radio fingerprint measurement data, and to retrieve a precise geographic position stored in the database 160 that corresponds to the matching radio fingerprint. The positioning node 140 may provide this geographic position data to the user equipment 120, 130 that sent the radio fingerprint measurement data, or to other destinations, such as, for example, an emergency or police call centre.

The GIS server 150 may comprise one or more server entities that provide geographic mapping services, or related mapping services. The GIS server 150 may receive geographic position data concerning the user equipment 120, 130 from the positioning node 140, or from the user equipment 120, 130, and may map the received geographic position data to physical coordinates or a physical address, or perform other mapping related services with the geographic position data.

The network 135 may include one or more networks of any type, including a Local Area Network (LAN); a Wide Area Network (WAN); a Metropolitan Area Network (MAN); a telephone network, such as a Public Switched Telephone Network (PSTN) or a Public Land Mobile Network (PLMN); a satellite network; an intranet, the Internet; or a combination of these or other networks. The PLMN may further include a packet-switched sub-network, such as, for example, General Packet Radio Service (GPRS), Cellular Digital Packet Data (CDPD), or Mobile IP network.

The present solution may be used with particular advantage in wireless communication systems 100 where it is possible to calculate periodic correlation in the receiver, which typically requires a cyclic prefix and where the wireless communication system 100 applies sequences with ideal periodic correlation properties.

The radio access technologies used for wireless communication within the wireless communication system 100 may comprise radio access technologies such as e.g. Long Term Evolution (LTE) etc, just to mention an example.

It will be appreciated that the number of components illustrated in FIG. 1 is purely exemplary. Other configurations with more, fewer, or a different arrangement of components may be implemented. Moreover, in some embodiments, one or more components in FIG. 1 may perform one or more of the tasks described as being performed by one or more other components in FIG. 1.

Figure 2:
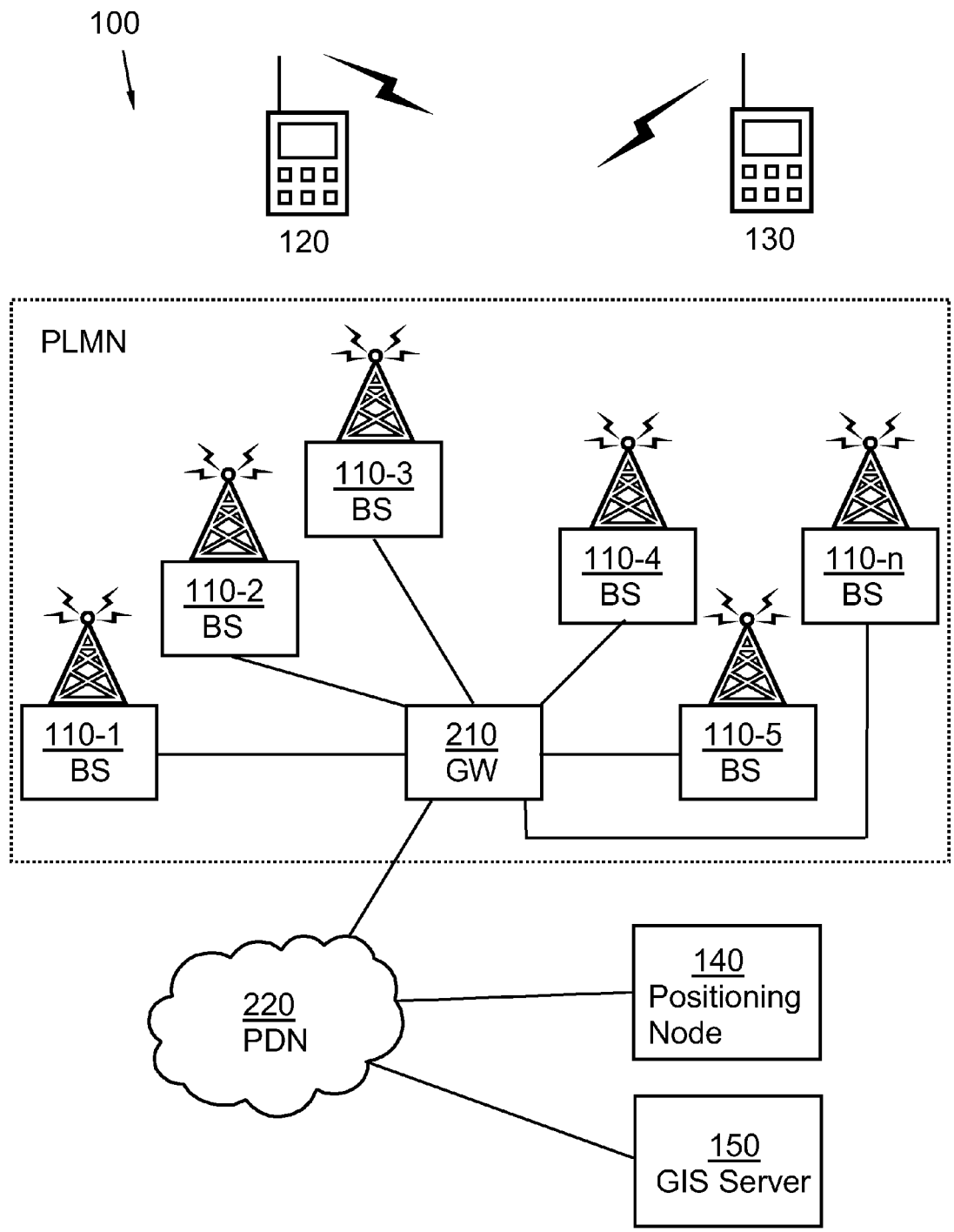
FIG. 2 is a schematic block diagram illustrating a wireless communication system according to some embodiments.

FIG. 2 illustrates an embodiment of the wireless communication system 100 of FIG. 1, where the wireless communication system 100 comprises a PLMN. The PLMN may implement Long Term Evolution (LTE) system architecture. As shown in FIG. 2, the user equipment 120, 130 may comprise cellular radiotelephones that are communicating with one another via the PLMN. The PLMN may comprise multiple base stations 110-1 through 110-$n$ along with their associated antenna arrays and one or more gateways (GW) 210. The gateway 210 may be connected to a Packet Data Network (PDN) 220 of the wireless communication system 100. Also, the PDN 220 may be further connected to the positioning node 140 and the GIS server 150. The PDN 220 may comprise any type of packet-switched network, such as, for example, the Internet.

The base stations 110-1 through 110-$n$ may interface with respective user equipments 120, 130, e.g., base station 110-1 may interface with the user equipment 120 via respective wireless links and may perform, among other functions, Medium Access Control (MAC) and Radio Link Control (RLC). For example, the base station 110-1 may receive data transmissions from the user equipment 120 and may forward those data transmissions on to the gateway 210. The gateway 210 may route data transmissions received from a respective base station 110 to another base station 110, or to positioning node 140 or GIS server 150 via PDN 220. The gateway 210 may further route data transmissions received from positioning node 140 or GIS server 150 via PDN 220 to a respective base station 110-1 through 110-$n$ associated with a destination user equipment 120, 130. Though the positioning node 140 is shown in FIG. 2 as connected to the PLMN by way of the PDN 220, in other implementations, the positioning node 140 may reside as a component of the PLMN, e.g. connected internally to the PLMN without messaging having to traverse the PDN 220.

Figure 3:
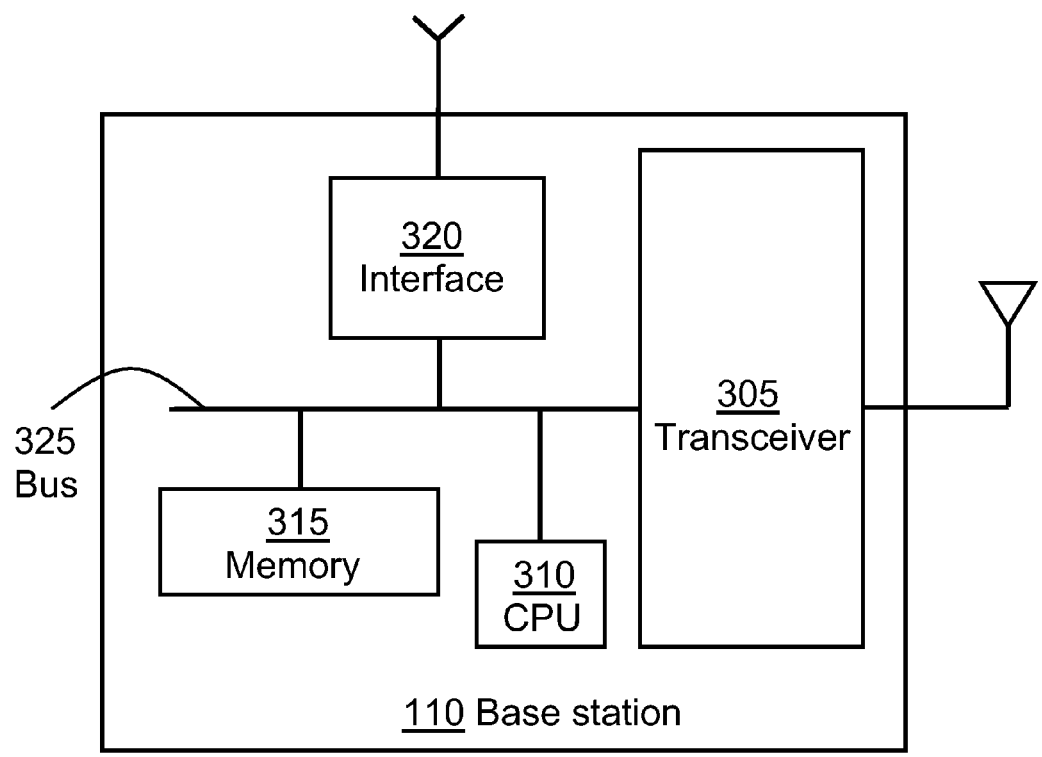
FIG. 3 is a schematic block diagram illustrating exemplary components of a base station according to some embodiments.

FIG. 3 illustrates one exemplary implementation of the base station 110. The base station 110 may comprise e.g. a transceiver 305, a processing unit 310, a memory 315, an interface 320 and a bus 325. The positioning node 140 and the GIS server 150 may also be similarly configured; however, the positioning node 140 and the GIS server 150 may not comprise the transceiver 305, according to some embodiments.

The transceiver 305 may comprise transceiver circuitry for transmitting and/or receiving symbol sequences using radio frequency signals via one or more antennas. The one or more antennas may comprise a single antenna or an antenna array and may comprise directional and/or omni-directional antennas. The transceiver 305 may additionally comprise measurement circuitry that may perform one or more of various different Evolved Universal Terrestrial Radio Access Network (E-UTRAN) radio fingerprint measurements, such as, for example, measuring the Evolved Universal Terrestrial Radio Access (E-UTRA) Uplink Reference Signal (UL RS) received power at the base station 110-1.

The processing unit 310 may comprise a processor, microprocessor, or processing logic that may interpret and execute instructions. Further, the processing unit 310 may perform all data processing functions for the base station 110. The memory 315 may provide permanent, semi-permanent, or temporary working storage of data and instructions for use by the processing unit 310 in performing device processing functions. Also, the memory 315 may comprise a primary storage memory unit such as a processor register, a cache memory, a Random Access Memory (RAM) or similar. The memory unit 315 may however in some embodiments comprise a secondary memory unit such as a Read Only Memory (ROM), Electrically Erasable Programmable Read-Only Memory (EEPROM), programmable read-only memory (PROM) or erasable programmable read-only memory (EPROM) or a hard disk drive. The memory unit 315 may however in some embodiments comprise an off-line storage memory unit, a flash memory, a USB memory or a memory card. The memory unit 315 may further in some embodiments comprise a Network-attached storage (NAS) or in fact any other appropriate medium such as and/or optical recording medium and its corresponding drive, or any other disk, tape or media that can hold machine readable data.

The interface 320 may comprise circuitry for interfacing with a link that connects to the gateway 210 or another base station 110. The bus 325 may interconnect the various components 305, 310, 315, 320 of the base station 110 to permit the components to communicate with one another.

The configuration of components of the base station 110 illustrated in FIG. 3 is for illustrative purposes only. Other configurations with more, fewer, or a different arrangement of components may be implemented.

Figure 4A:
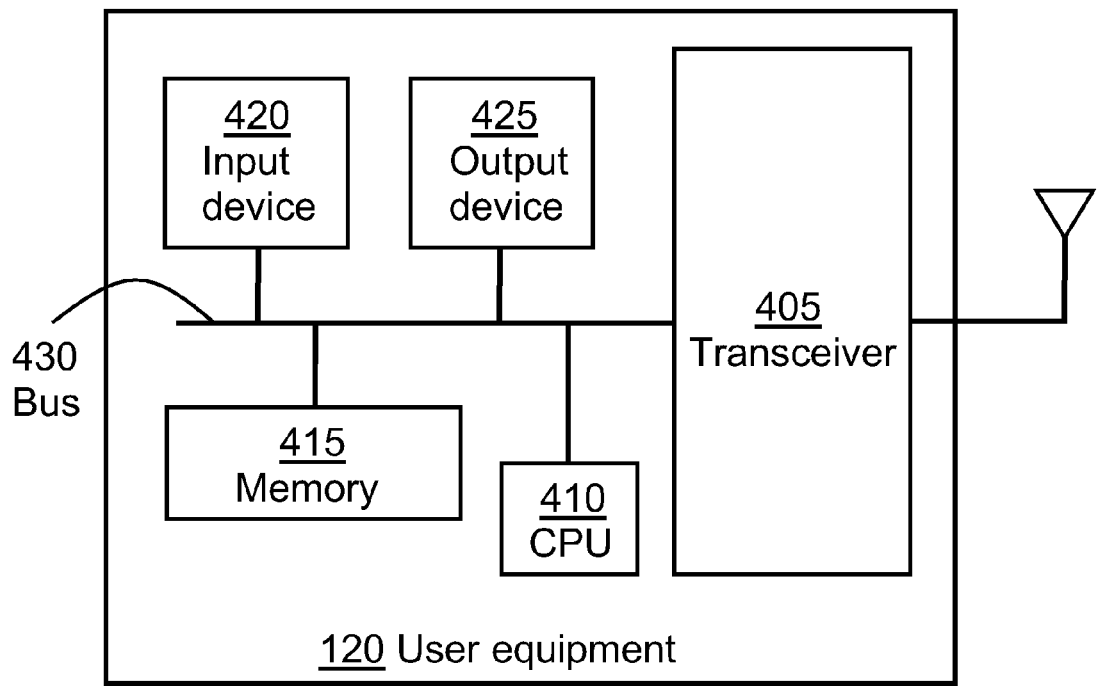
FIG. 4A is a schematic block diagram illustrating exemplary components of a user equipment according to some embodiments.

FIG. 4A illustrates the user equipment 120 consistent with an exemplary embodiment. Other user equipments such as e.g. the user equipment 130 may be similarly configured. The user equipment 120 may comprise a transceiver 405, a processing unit 410, a memory 415, an input device 420, an output device 425, and a bus 430.

The transceiver 405 may comprise transceiver circuitry for transmitting and/or receiving symbol sequences using radio frequency signals via one or more antennas. The transceiver 405 may additionally comprise measurement circuitry that may perform one or more of various different E-UTRAN radio fingerprint measurements, based on e.g. one or more of the following: signal propagation time measurement value, signal propagation delay value, Round Trip Time measurement, E-UTRA Reference Signal Received Power (RSRP); E-UTRA Carrier Received Signal Strength Indicator, (E-UTRA carrier RSSI); E-UTRA Reference Signal Received Quality (RSRQ).

The processing unit 410 may comprise a Central Processing Unit (CPU), processor, microprocessor, or processing logic that may interpret and execute instructions. The processing unit 410 may perform all data processing functions for inputting, outputting, and processing of data, comprising data buffering and device control functions, such as call processing control, user interface control, or the like.

The memory 415 may provide permanent, semi-permanent, or temporary working storage of data and instructions for use by the processing unit 410 in performing device processing functions. The memory 415 may comprise ROM, RAM, large-capacity storage devices, such as a magnetic and/or optical recording medium and its corresponding drive, and/or other types of memory units. The input device 420 may comprise mechanisms for entry of data into the user equipment 120. The key pad may permit manual user entry of data into the user equipment 120. The microphone may comprise mechanisms for converting auditory input into electrical signals. The display unit may comprise a screen display that may provide a user interface, e.g., a graphical user interface that can be used by a user for selecting device functions. The screen display of the display unit may comprise any type of visual display, such as, for example, a Liquid Crystal Display (LCD), a plasma screen display, a Light-Emitting Diode (LED) display, a Cathode Ray Tube (CRT) display, an Organic Light-Emitting Diode (OLED) display, etc.

The output device 425 may comprise mechanisms for outputting data in audio, video and/or hard copy format. For example, the output device 425 may comprise a speaker (not shown) that includes mechanisms for converting electrical signals into auditory output. The output device 425 may further comprise a display unit that displays output data to the user. For example, the display unit may provide a graphical user interface that displays output data to the user. The bus 430 may interconnect the various components of the user equipment 120 to permit the components to communicate with one another.

The configuration of components of the user equipment 120 illustrated in FIG. 4A is for illustrative purposes only. Other configurations with more, fewer, or a different arrangement of components may be implemented. For example, in some implementations, the user equipment 120 may comprise, or be connected to a GPS position measuring device.

Figure 4B:
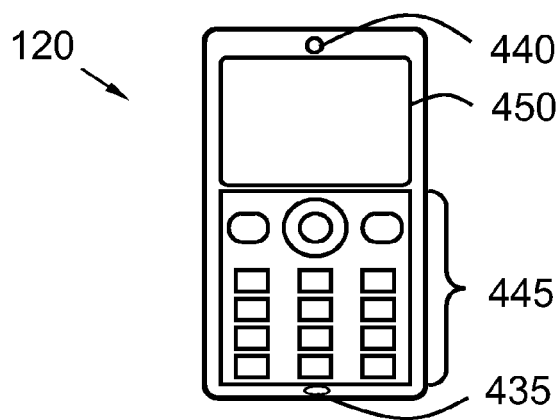
FIG. 4B is a schematic block diagram illustrating a user equipment according to some embodiments where the user equipment is embodied as a cellular telephone.

FIG. 4B illustrates an exemplary implementation of the user equipment 120 in which the user equipment 120 comprises a cellular radiotelephone. As shown in FIG. 4B, the user equipment 120 may comprise a microphone 435, e.g., of input device 420 for entering audio information into the user equipment 120, a speaker 440, e.g., of output device 425 for providing an audio output from the radiotelephone, a keypad 445, e.g., of input device 420 for manual entry of data or selection of telephone functions, and a display 450, e.g., of input device 420 or output device 425 that may visually display data to the user and/or which may provide a user interface that the user may use to enter data or to select telephone functions, in conjunction with keypad 445.

Time Measurements

The present measurement solutions may be utilized for performing a plurality of timing measurements. The timing estimates may in turn be used e.g. for generating radio fingerprints for the purpose of geographical positioning.

An example of such timing estimate is the Time of arrival time difference which is the time difference between two signals received over the first path of the channels between serving respectively target cells and user equipment. Other examples are the user equipment RX-TX time difference, the base station Round Trip Time and/or Propagation delay.

The Time of arrival time difference is the time difference between two signals of the same kind received over the first path of the channels between serving respectively target cell and user equipment. This measurement may be performed in the user equipment 120.

The user equipment RX-TX time difference is the time difference between the beginning of that part of the received signal that has propagated through a first channel path and the beginning of signal transmission in response to this received signal. This measurement may be performed in the user equipment 120.

The Round Trip Time is the elapsed time for transit of a signal over a closed circuit, or time elapsed for a signal to a remote node and back again. Thus the Round Trip Time is the time difference between beginning of signal transmission and the estimated beginning of that part of the received signal, that has propagated through a first channel path. This measurement may be performed in the base station 110.

The propagation delay may be calculated by using the RTT measurement and the RX-TX time difference measurement. The base station 110 can calculate the propagation delay, and hence the distance, between the base station 110 and the user equipment 120.

The calculation of the timing estimates will be explained more in detail later in the description.

The calculated timing estimate may then be provided for use when determining geographical position data. According to some embodiments, the calculated timing estimate may be sent to the user equipment 120. According to some embodiments, the calculated timing estimate may be sent to a positioning node 140, comprised within the wireless communication system 100.

In LTE, OFDMA is used in the downlink and SC-FDMA in the uplink. In both transmission directions a cyclic prefix may be applied, which transforms—within the duration of one OFDMA or SC-FDMA symbol—the linear convolution, as it is performed by the wireless channel, into a circular convolution as long as the delay spread of the wireless channel fits into the cyclic prefix and the synchronization is accurate enough.

Many of the sequences used in LTE, such as e.g. sequences used for reference signals, synchronization signals, random access preamble, etc possess good or ideal periodic ACF properties. By using a circular correlator, for example a frequency domain correlator, to perform timing measurements for positioning, the perfect correlation properties may be better utilized.

Sequences in LTE

It may according to the present solution for performing timing measurements be an advantage to utilize any sequence in LTE, having a flat spectrum across the allocated subcarriers.

In the downlink, the synchronization channel and/or demodulation reference signals may be used, according to some embodiments. The synchronization channel may be based on Zadoff-Chu (ZC) or m-sequences mapped to adjacent subcarriers in the frequency-domain. These sequences have a flat spectrum across the allocated subcarriers. For the demodulation reference signal, unitary sequences are mapped to every K-th subcarriers in the frequency-domain.

For uplink transmission in LTE, some sequences having a flat spectrum across the allocated subcarriers may be utilized for performing timing measurements according to some embodiments. Some non limiting examples of such sequences are Random access preamble, Demodulation reference signals and Sounding reference signals.

The uplink transmission thus may comprise a random access preamble, based on Zadoff-Chu sequence in time-domain. Random access preambles are defined in time-domain and are based on Zadoff-Chu sequences. Due to special properties of Zadoff-Chu sequences is a Zadoff-Chu sequence transformed by means of a DFT also a Zadoff-Chu sequences. Thus random access preambles maintain their spectral flatness property after application of Discrete Fourier Transform (DFT) precoding, due to properties of Zadoff-Chu sequences, and therefore posses a flat spectrum across the allocated subcarriers. The random access signal may be mapped to adjacent subcarriers. The uplink transmission may further be based on demodulation reference signals. Those comprise unitary sequences mapped to consecutive subcarriers in frequency-domain. These sequences have a flat spectrum across the allocated subcarriers. Further, the uplink transmission may be based on Sounding reference signals. These comprise unitary sequences mapped to subcarriers in the frequency-domain. The subcarrier mapping may either be localized or distributed. These sequences have a flat spectrum across the allocated subcarriers.

Figure 5:
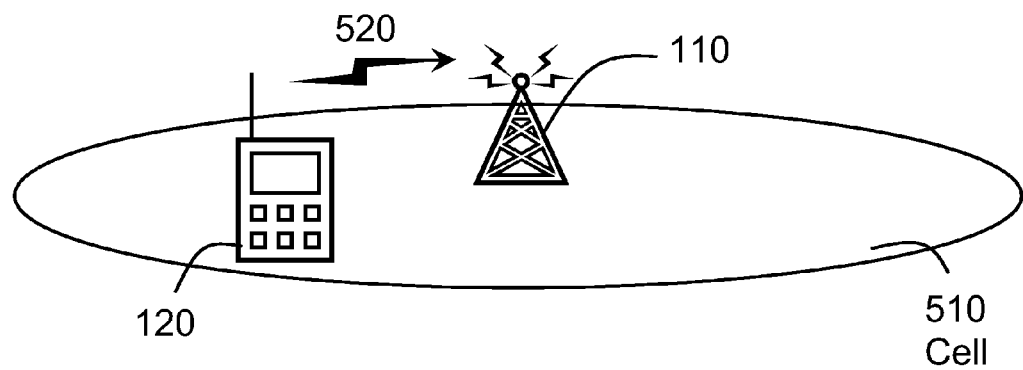
FIG. 5 is a schematic block diagram depicting the uplink transmission of Evolved Universal Terrestrial Radio Access Network (E-UTRAN) radio fingerprint from a user equipment to a base station in a cell in a wireless communication network.

FIG. 5 is a diagram that depicts the uplink transmission of E-UTRAN radio fingerprint measurement data from the user equipment 120 to the base station 110 in a cell 510 of a wireless network 135. The user equipment 120 may, at a certain location point in cell 510, perform one or more E-UTRA and/or inter-RAT (IRAT) measurements and may send the results of those measurements as E-UTRAN radio fingerprint measurement data 520 to the base station 110-1. The E-UTRAN radio fingerprint measurement data 520 may be based on one or more of the following measurements: signal propagation time measurement value, Time of Arrival, Time of Arrival time difference, Rx-Tx time difference, E-UTRA reference signal received power (RSRP) measured at the user equipment 120, E-UTRA carrier RSSI measured at the user equipment 120, E-UTRA RSRQ measured at the user equipment 120.

In other embodiments, E-UTRAN radio fingerprint measurement data 520 may comprise additional or alternative measurements. Upon receipt of E-UTRAN radio fingerprint measurement data 520 by the base station 110-1, the base station 110-1 may forward data 520 on to positioning node 140 via e.g. the gateway 210 and PDN 220 for a geographic position determination based on radio fingerprint measurement data 520.

The present methods and arrangements may be useful in particular for computing timing estimates of e.g. signal propagation time measurement value, signal propagation delay value, Round Trip Time measurement, Time of Arrival, Rx-Tx time difference etc., as timing estimation values may be measured with higher accuracy. Thereby the ability to generate unique radio fingerprint for each geographical position increase.

Figure 6:
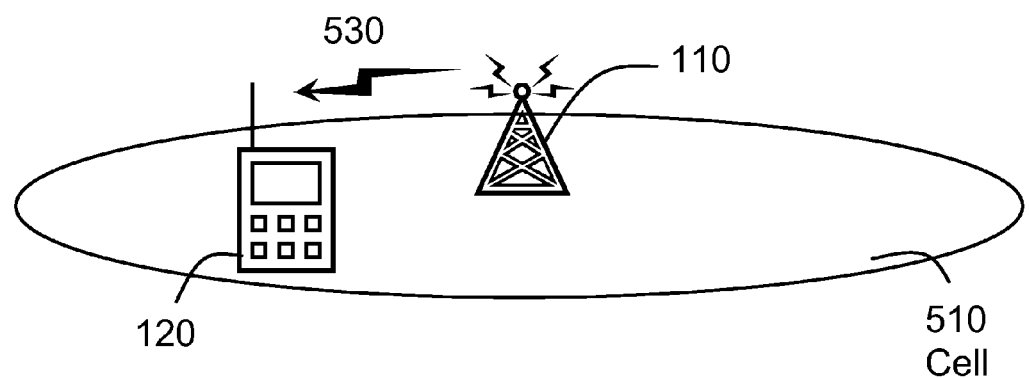
FIG. 6 is a schematic block diagram depicting the downlink transmission of the user equipment's geographical position from the base station in a cell in a wireless communication network, after the performance of a radio fingerprint look-up at a positioning node.

FIG. 6 is a diagram that depicts the downlink transmission of the user equipment 120's geographic position 530 from the base station 110 to the user equipment 120 in the cell 510 after the performance of a radio fingerprint look-up at the positioning node 140. The base station 110 may receive the geographic position data 530 from the positioning node 140, via e.g. the PDN 220 and the gateway 210, and may then transmit it on the downlink to the user equipment 120. The geographic position data 530 may comprise an accurate position of the user equipment 120 obtained by positioning node 140 based on measurement data 520 of FIG. 5. The geographic position data 530 may comprise, for example, latitude/longitude coordinates, GPS coordinates, a physical address, etc.

Timing Estimates Performed in the User Equipment 120

According to some embodiments, timing measurements may be performed in the user equipment 120. The modulation scheme used in the downlink of LTE is OFDMA. Assuming an accurate enough synchronization, the received signal within the DFT receiver window is the circular convolution of the transmitted sequence and the impulse response of the wireless channel. The output signal of the circular correlator becomes:

$$z(n) = R_{xx}(n) \otimes h(n)$$

The symbol $\otimes$ denotes circular convolution and Rxx(n) is the periodic ACF of the transmitted signal x(n). The impulse response of the wireless channel is denoted h(n).

The above formula may be valid if the user equipment 120 is already sufficiently synchronized to the downlink timing. If this is not the case, a two step procedure can be envisioned where in the first step good enough synchronization is achieved and in the second step above outlined circular filtering is applied. Good enough means here: within the cyclic prefix such that the signal within the DFT window is cyclic.

With a sequence x(n) possessing ideal periodic ACF properties, i.e. $R_{xx}(n) = \delta(n)$, the above equation reduces to:

$$z(n) = h(n)$$

The output signal of the circular correlator is now an estimate of the wireless channel and the timing of the first path can be detected. In order to improve the quality of the estimate it is possible to average over multiple estimates of h(n), either obtained with the same type of x(n) or by different types of x(n) with ideal periodic ACF. The timing estimate is then based on the first path of the estimated impulse response.

The above formula is valid if $X_k$—the DFT of x(n)—is modulated on all subcarriers. In general this is not the case, e.g. the synchronization channel spans only a fraction of the system bandwidth, reference signal are only modulated on every K-th subcarriers, etc.

More generally assume that $X_k$ is of length N and is modulated onto every K-th subcarrier. The output signal of the OFDM demodulator becomes then:

$$Y_k = \begin{cases} X_l H_k, & k = k_0 + lK, \quad l = 0, 1, K, N-1 \\ 0, & k \text{ otherwise} \end{cases}$$

After multiplying subcarriers $k=k_0+lK$, $l=0,1,K,N-1$ with $X^*_k$ (assuming a sequence $x(n)$ with perfect periodic ACF) the following is obtained:

$$Z_k = \begin{cases} H_k, & k = k_0 + lK, \quad l = 0, 1, K, N-1 \\ 0, & k \text{ otherwise} \end{cases}$$

and after applying a length M IDFT the time-domain signal becomes:

$$z(n) = IDFT\{Z_k\}$$
$$= h(n) \otimes t(n), n = 0, 1, K, M-1$$

The sequence $t(n)$ is the length M IDFT transform of the frequency-domain impulse train $$T_k = \delta_{k0+lk}, \, l=0,1K,N-1$$

and can be written as $$t(n) = \frac{1}{M} \exp\left(j\frac{\pi}{M}(KN - K + 2k_0)n\right) \frac{\sin\frac{\pi KNn}{M}}{\sin\frac{\pi Kn}{M}}$$

For the special case $K=1$, $M=N$ this expression reduces to $\delta(n)$ and the result $z(n)=h(n)$ is obtained.

Figure 7A:
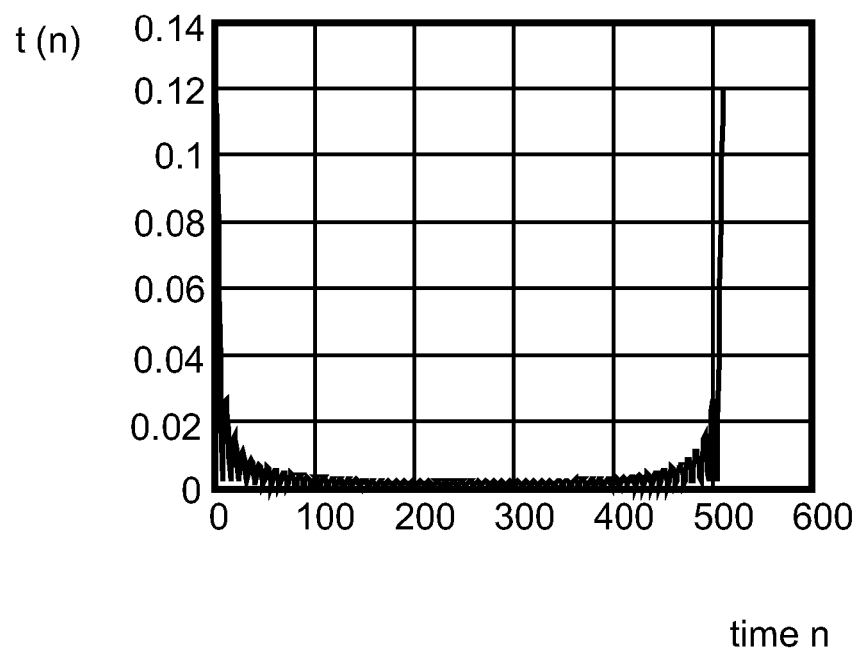
FIG. 7A is a schematic drawing depicting a sequence t(n) for the synchronization signal in LTE.

FIG. 7A is a schematic diagram depicting a sequence $t(n)$ for the synchronization signal in LTE. The FIG. 7A shows $t(n)$ for an arrangement that corresponds to the primary synchronization channel, i.e. only the 63 subcarriers in the centre are modulated. For the IDFT size M=512 is assumed, i.e. the obtained timing resulting corresponds to a 5 MHz LTE system. In this plot is assumed that also the DC subcarrier is modulated. In case the DC subcarrier is not modulated above analysis still applied if the not modulated DC subcarrier is considered in the calculation of $t(n)$.

Figure 7B:
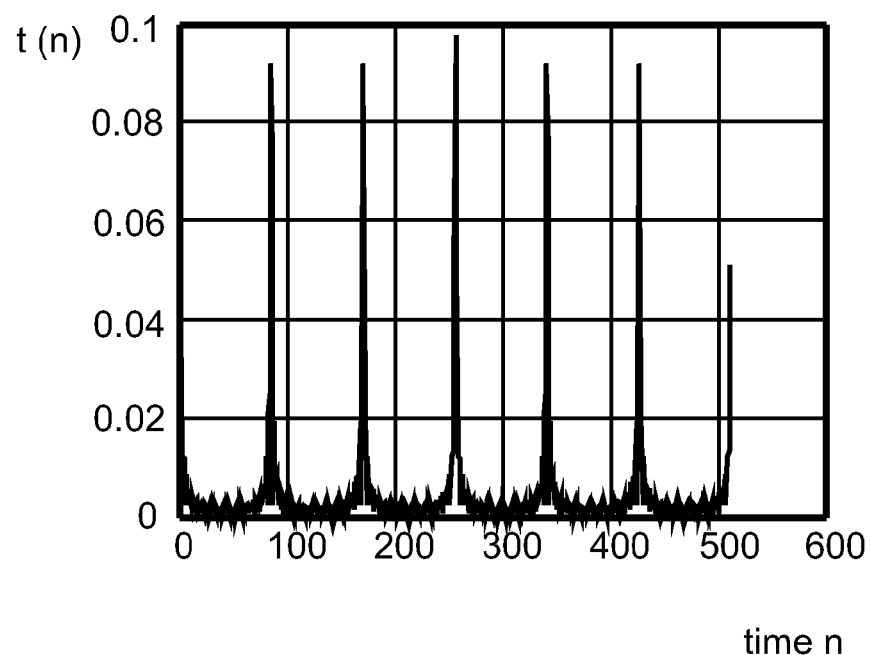
FIG. 7B is a schematic drawing depicting a sequence t(n) for the reference signals in LTE.

FIG. 7B is a schematic diagram depicting a sequence $t(n)$ for the reference signals in LTE. FIG. 7B shows $t(n)$ for a subcarrier allocation used for the reference signals in LTE, i.e. only every 6-th subcarrier within a bandwidth of 300 subcarriers is modulated. Also here the IDFT size M=512 may be assumed.

In case that the sequence $X_k$ is not placed on consecutive subcarriers but only on every K-th one, as it may be the case for reference signals, $t(n)$ becomes impulse train like with sinc-like functions centred on each peak. The correlator output signal, which is the channel impulse response circular convolved with $t(n)$, has a similar shape. This results in ambiguous timing estimates without additional knowledge. However, since the user equipment 120 is already roughly, within the cyclic prefix, synchronized, the timing estimate becomes unambiguous again. In order to improve the obtained channel estimate, and thus the first peak which is used for timing estimation, subcarriers not modulated by the signal used to perform the measurement may be set to zero.

With a subcarrier bandwidth $\Delta f$ the obtained signal $z(n)$ spans duration of $1/\Delta f$ and is sampled M times, the sampling interval of the signal $z(n)$ becomes: $\Delta T=1/(M \cdot \Delta f)$.

Another possibility may be to map the distributed and modulated subcarriers carrying the signal $Z_k$ to a localized block and feed this block of consecutive subcarriers into an IDFT device. Mapping the distributed subcarriers into a localized block corresponds essentially to down-sampling in frequency-domain or superposition of cyclic shifted versions of the time-domain signal. The obtained time-domain signal spans essentially 1/K-th of the signal period depicted in FIG. 7B. With an IDFT size of M the sampling interval becomes $\Delta T=1/(M \cdot K \cdot \Delta f)$.

Synchronization signals and reference signals may be used to estimate the timing. However, also other signals having constant magnitude across modulated subcarriers, such as e.g. QPSK modulated data channels or control channels, can be used for timing estimation according to some embodiments. After the signals have been successfully decoded the transmitted frequency-domain signal $X_k$ can be reconstructed. Since $X_k$ posses a constant magnitude it has an ideal periodic ACF, if applied to all subcarriers, or otherwise previous analysis applies. In this case the function $T_k$ may be adapted to the subcarrier allocation of the used signal. In order to obtain a single sharp peak in the correlator output signal, the used signal may be preferable localized.

Timing Measurements Performed in the Base Station 110

Timing measurements may however, according to some embodiments be performed in the base station 110. The modulation scheme used in the LTE uplink is based on SC-FDMA which can be modelled as DFT-precoded OFDM. Also here a cyclic prefix is applied and thus the analysis from the previous section also applies here. Signals used to estimate the channel and timing in the uplink may preferably have a constant magnitude across used subcarriers.

Data signals, which are applied to the DFT precoding, may therefore typically not be used since they are not flat in frequency domain. Random access signals, even though defined in time-domain and also applied to the DFT precoder, may be used since the special sequences used for random access ensure a constant magnitude across all subcarriers, even after DFT precoding. Demodulation and sounding reference signals are directly injected into the OFDM modulator without precoding and may be used for channel and timing estimation. Demodulation reference signals are localized in LTE whereas sounding reference signals can either have localized or distributed subcarrier mapping.

In case of an OFDM based uplink all signals with constant amplitude across modulated subcarriers, e.g. QPSK modulated data or control signals can be used for channel and timing estimation.

The base station 110 may, when receiving the signal detect the beginning of that part of the received signal that has propagated through a first channel path in a method step. The detection of the beginning of that part of the received signal that has propagated through the first channel path is made using a circular correlator.

The output signal $z(n)$ of the circular correlator may be fed into a comparator that outputs the first sample position $n_0$ where $|z(n)|$ (or any other similar metric, e.g. $|z(n)|^2$) exceeds a certain threshold value. Typically this threshold value depends on the statistical properties of the noise at the comparator input. Assuming the first path occurs at sample $n_0$ the corresponding time becomes then $t_0=n_0 \cdot \Delta T$.

When the beginning of that part of the received signal that has propagated through a first channel path is successfully detected, a timing estimate may be calculated. The calculation of the timing estimate may be performed in different ways, depending e.g. on the type of timing estimate, such as e.g. Time of arrival, time difference of arrival, Rx-Tx time difference, Round Trip Time, one way signal propagation delay.

When the Time of arrival time difference between the first path of serving and target cell is computed, the difference between $t_{0,t}$ and $t_{0,s}$ is measured on signals of the same kind originating from the target and serving cell, respectively, where $t_{0,t}$ and $t_{0,s}$ are the receive times of those parts of the signals which are received over the first path of target and serving cell. This measurement may be performed at the user equipment 120 and any of the signals outlined above for downlink measurements may be used for this purpose.

The RX-TX time-difference in the user equipment 120 is the time difference between $t_{0,s}$ obtained from a specified signal and the beginning of a signal transmission in response to the received signal. This measurement may be performed at the user equipment 120 and any of the signals outlined above for downlink measurements may be used for this purpose.

The Radio Base Station Round Trip Time (RBS RTT) is the time difference measured at the base station between the beginning of a signal received over a first channel path in response to a second transmitted signal and beginning of a first signal transmission at the base station that triggered the second signal transmission and this measurement. This measurement may be performed at the base station 110 and any of the signals outlined above for uplink measurements may be used for this purpose.

One example of such a measurement is random access reception at the base station 110. Even though random access is typically not triggered by the base station 110, even though it is possible e.g. in case of handover, its transmission timing has a certain relation to the received downlink timing. The triggering signal is then a downlink signal with such a timing relation to the random access transmission. Typically the synchronization signal can be seen as triggering signal.

Another example of such a measurement is PUCCH reception at the base station 110, triggered by a PDCCH transmission. To be more specific, the user equipment 120 gets uplink control channel resources assigned via PDCCH and responds on PUCCH, in LTE. Since for transmission on PUCCH, the user equipment 120 is already uplink synchronized, the Round Trip Time is calculated as the previous Round Trip Time, which information is available via the timing alignment for the user equipment 120, plus the difference of the PUCCH arrival time since the last timing alignment command. Other forms of PUCCH signal transmission where the uplink control channel resources are not assigned via PDCCH but via higher layer signalling can be also envisioned.

A third example of such a measurement is PUSCH reception at the base station triggered by an UL grant received over PDCCH. Also here the uplink is already synchronized thus the Round Trip Time is calculated as the previous Round Trip Time, which information is available via the timing alignment for the user equipment 120, plus the difference of the PUSCH arrival time since the last timing alignment command.

The uplink sounding reference signal transmission triggered by the base station 110 is a fourth example of this measurement.

The measurement results related to timing estimations for fingerprinting positioning in LTE may be signalled between the base station 110 and the user equipment 120.

According to some embodiments, the base station 110 (i.e. eNode B) measures and signals the measured timing estimations to the user equipment 120, and/or to the positioning node 140. This is because in E-UTRAN all radio network functions reside in the base station 110 (eNode B). The signalling to the user equipment 120 enables the application of terminal based positioning methods employing fingerprinting based on the made timing estimations.

Figure 8:
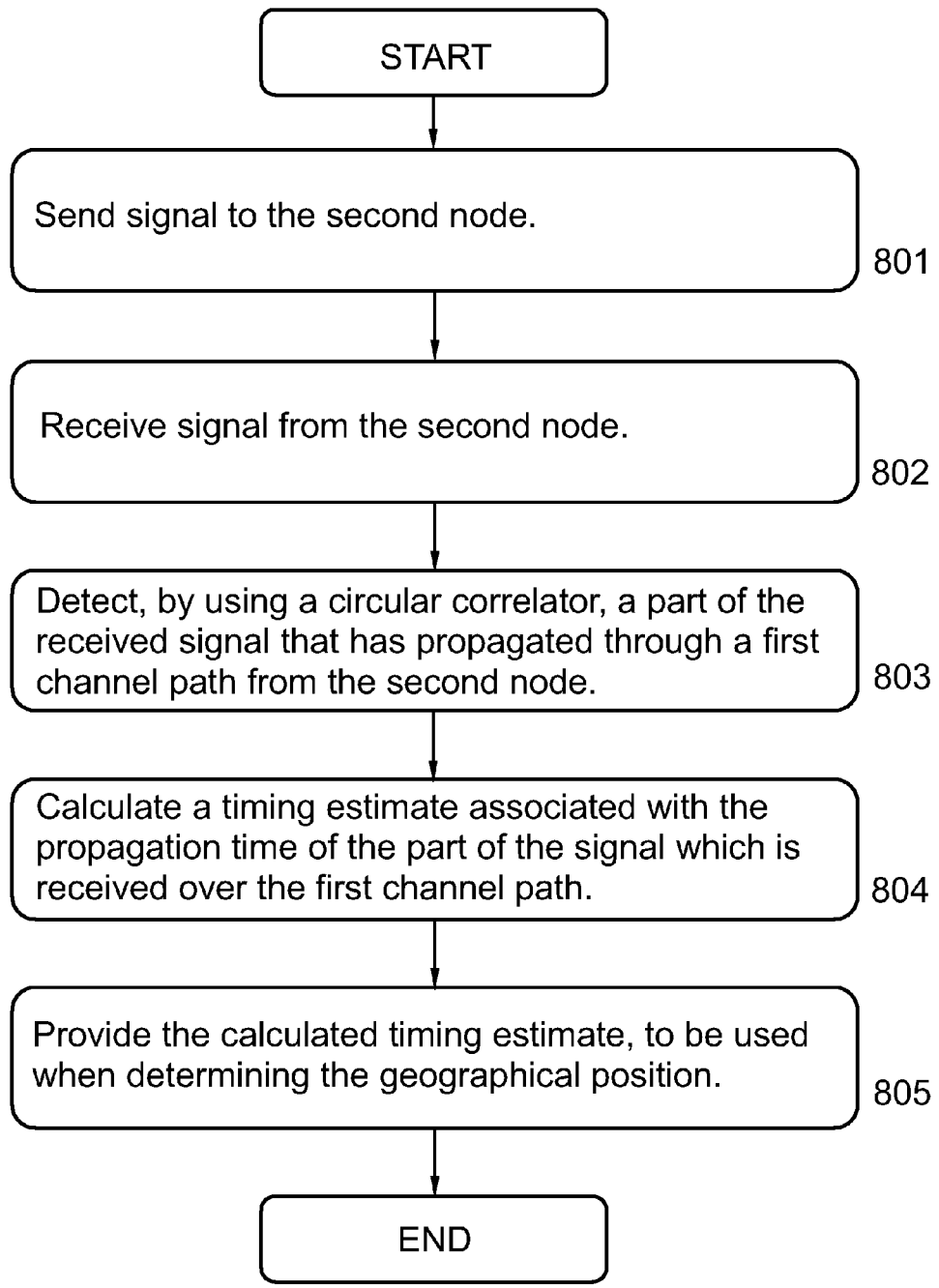
FIG. 8 is a schematic flow chart illustrating an embodiment of the present method in a first node.

FIG. 8 is a flow chart illustrating a method in the first node 110, for providing geographical position related information. The geographical position related information may comprise a timing estimate. The first node 110 and a second node 120 are comprised within a wireless communication system 100. Further, the first node 110 and the second node 120 are adapted to exchange wireless signals. The first node 110 may, according to some embodiments, be represented by a base station and the second node 120 may be represented by a user equipment. The geographical position related information may, according to these embodiments, concern the second node 120, represented by the user equipment.

However, according to some embodiments, the first node 110 may be represented by a user equipment and the second node 120 may be represented by a base station. According to these embodiments, the geographical position related information concerns the first node 110, represented by the user equipment.

To appropriately provide geographical position related information, the method may comprise a number of steps 801-805. It is however to be noted that some parts of the described method steps are optional and only comprised within some embodiments. Further, it is to be noted that the method steps 801-805 may be performed in any arbitrary chronological order and that some of them, e.g. step 802 and step 803, or even all steps may be performed simultaneously or in an altered, arbitrarily rearranged, decomposed or even completely reversed chronological order. The method comprises the following steps:

Step 801

This method step is optional and only performed within some embodiments. A signal is sent to the second node 120.

According to some optional embodiments, the signal received from the second node 120 is a signal with constant magnitude across allocated frequencies at least in the allocated subcarriers at the transmitter. Thus the spectrum of the transmitted signal may be flat at the transmitter, but may be attenuated by a frequency selective channel at the receiver and may therefore no longer remain flat at the receiver, according to some embodiments.

According to some embodiments, the signal may be any signal type within the group: reference signal, random access signal, and synchronization signal. The reference signal may be e.g. a demodulation reference signal or a sounding reference signal.

Step 802

A signal is received from the second node 120.

The signal is, according to some embodiments, a signal with constant magnitude across allocated frequencies at least in the allocated subcarriers.

According to some embodiments, the signal may be any signal type within the group: reference signal, random access signal, synchronization signal. The reference signal may be e.g. a demodulation reference signal or a sounding reference signal.

Step 803

A part of the received signal that has propagated through a first channel path from the second node 120 is detected by using a circular correlator.

Step 804

A timing estimate associated with the propagation time of the part of the signal which is received over the first channel path from the second node 120 is calculated.

According to some embodiments, the timing estimate may comprise any of the parameters: Time of arrival, Time of arrival time-difference, Round Trip Time, one way signal propagation delay or User Equipment RX-TX time-difference.

According to some embodiments, in particular when the first node 110 is represented by a base station and the second node 120 is represented by a user equipment, the timing estimate may comprise Round Trip Time, one way signal propagation delay or Time of Arrival.

According to some embodiments, in particular when the first node 110 is represented by a user equipment and the second node 120 is represented by a base station, the timing estimate may comprise Time of arrival time-difference and/or user equipment RX-TX time-difference.

Step 805

The calculated timing estimate, to be used when determining the geographical position is provided.

According to some embodiments, the calculated timing estimate is send to the second node 120, to be used by the second node 120 when determining the geographical position.

According to some embodiments, the calculated timing estimate is send to a positioning node 140, comprised within the wireless communication system 100, which timing estimate is to be used by the positioning node 140 when determining the geographical position.

Figure 9:
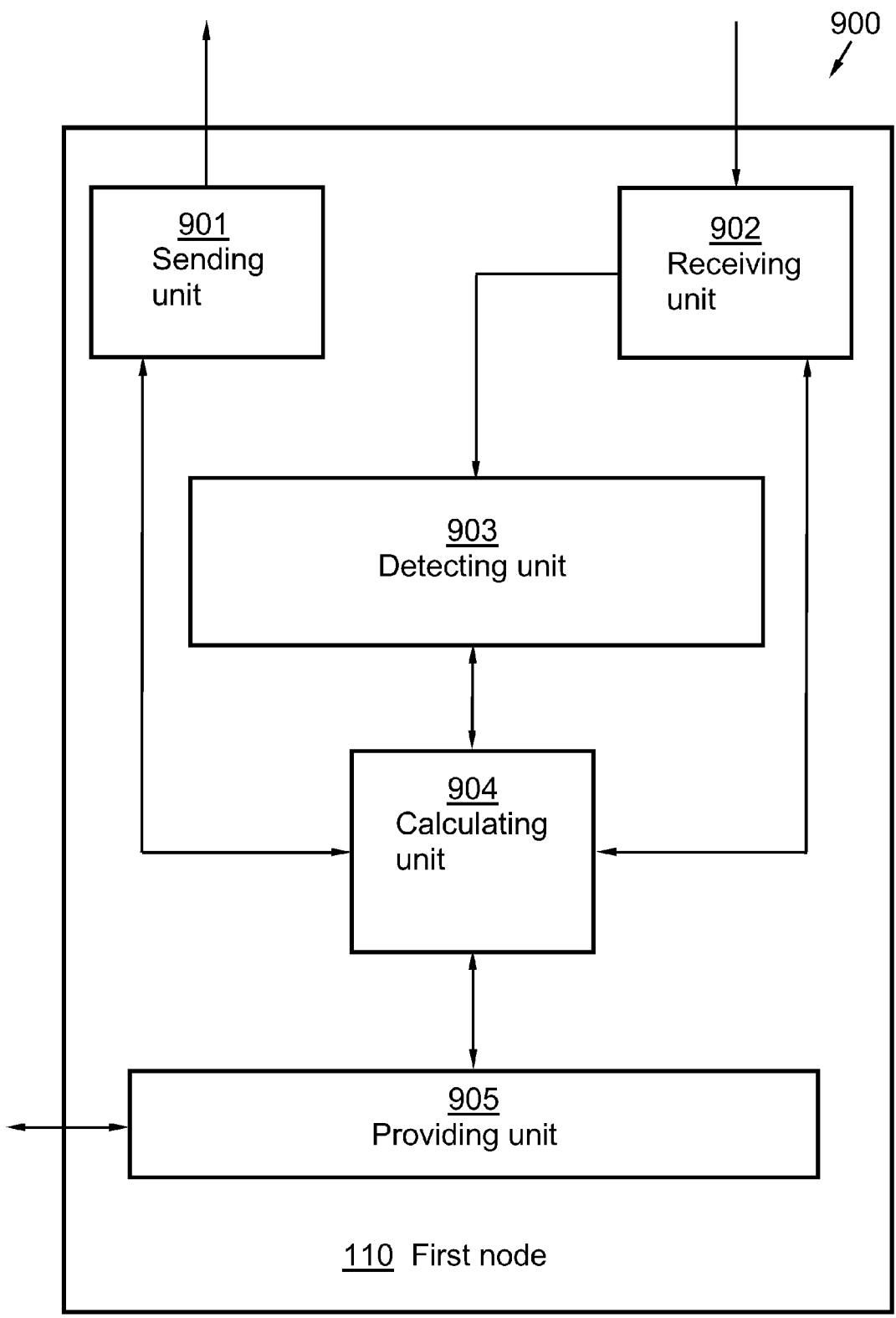
FIG. 9 is a schematic block diagram illustrating an arrangement in a first node according to some embodiments.

To perform the method steps above, the first node 110 comprises an arrangement 900, depicted in FIG. 9. The arrangement 900 is configured for providing geographical position related information. The geographical position related information may comprise a timing estimate. The first node 110 and a second node 120 are comprised within a wireless communication system 100. The first node 110 and the second node 120 are adapted to exchange wireless signals.

The arrangement 900 comprises a receiving unit 902. The receiving unit 902 is adapted to receive a signal from the second node 120. The arrangement 900 also comprises a detecting unit 903. The detecting unit 903 is adapted to use a circular correlator to detect a part of the received signal that has propagated through a first channel path from the second node 120. Further, the arrangement 900 in addition comprises a calculation unit 904. The calculation unit 904 is adapted to calculate a timing estimate associated with the propagation time of the part of the signal which is received over the first channel path from the second node 120. Further yet, the arrangement 900 comprises a providing unit 905. The providing unit 905 is adapted to provide the calculated timing estimate, to be used when determining the geographical position of the second node 120.

The arrangement 900 may, according to some optional embodiments, comprise a sending unit 901. The sending unit 901 may be adapted to send a signal to the second node 120.

It is to be noted that any internal electronics of the first node 110 not completely necessary for performing the present method according to the method steps 801-805, such as e.g. some of the internal electronics of the base station depicted in FIG. 3 and/or the user equipment depicted in FIGS. 4A and 4B, has been omitted from FIG. 9, for clarity reasons.

The calculating unit 904, which is comprised within the arrangement 900 in the first node 110 may be a processing unit, a CPU or any logic machine with ability to execute a computer program.

It is to be noted that the described units 901-905 comprised within the arrangement 900 in the first node 110 are to be regarded as separate logical entities but not with necessity separate physical entities. Any, some or all of the units 901-905 may be comprised or co-arranged within the same physical unit. However, in order to facilitate the understanding of the functionality of the arrangement 900 in the first node 110, the comprised units 901-905 are illustrated as separate physical units in FIG. 9.

Thus the sending unit 901 and e.g. the receiving unit 902 may, according to some embodiments, be comprised within one physical unit, a transceiver, which may comprise a transmitter circuit and a receiver circuit, which respectively transmits outgoing radio frequency signals to the second node 120 and receives incoming radio frequency signals from the second node 120 via an antenna. The antenna may be an embedded antenna, a retractable antenna or any antenna known to those having skill in the art without departing from the scope of the present invention. The radio frequency signals transmitted between the second node 120 and the first node 110 may comprise both traffic and control signals e.g., paging signals/messages for incoming calls, which may be used to establish and maintain a voice call communication with another party or to transmit and/or receive data, such as SMS, e-mail or MMS messages, with another remote user equipment 130.

The first node 110 may, according to some embodiments, be represented by a base station and the second node 120 may be represented by a user equipment. The geographical position related information may, according to these embodiments, concern the second node 120, represented by the user equipment. However, according to some embodiments, the first node 110 may be represented by a user equipment and the second node 120 may be represented by a base station. According to these embodiments, the geographical position related information concerns the first node 110, represented by the user equipment.

Some Particular Embodiments

The present method for providing geographical position related information, may be implemented through one or more processors in the first node 110, together with computer program code for performing the functions of the present method. The program code mentioned above may also be provided as a computer program product, for instance in the form of a data carrier carrying computer program code for performing the methods according to the respective method steps when being loaded into the processor unit. The data carrier may be e.g. a CD ROM disc, a memory stick, or any other appropriate medium such as a disk or tape that can hold machine readable data. The computer program code may furthermore be provided as pure program code on a server and downloaded to the first node 110 remotely.

Thus a computer readable medium encoded with a computer program for providing geographical position related information may perform the method according to at least some of the method steps 801-805.

The invention claimed is:

1. A method in a first node, for providing geographical position related information, the first node and a second node are comprised within a wireless communication system and adapted to exchange wireless signals, the method comprises the steps of:

receiving a signal from the second node, detecting, by using a circular correlator, a part of the received signal that has propagated through a channel path from the second node, calculating a timing estimate associated with the propagation time of the part of the signal which is received through the channel path from the second node, providing the calculated timing estimate for use when determining the geographical position related information, wherein the first and second nodes comprise a base station and a user equipment, respectively, or comprise the user equipment and the base station, respectively, receiving radio fingerprint measurement data from the user equipment at the base station after providing the calculated timing estimate, and after receiving the radio fingerprint measurement data from the user equipment, transmitting the geographical position related information from the base station to the user equipment, wherein the geographical position related information is based on the radio fingerprint measurement data and is indicative of a geographic position of the user equipment.

2. The method according to claim 1, further comprising, the step of:

sending the calculated timing estimate to the second node for use by the second node to determine the geographical position related information.

3. The method according to claim 1, wherein the calculated timing estimate comprises at least one of the following parameters: Time of arrival, Time of arrival time-difference, Round Trip Time, one way signal propagation delay, User Equipment RX-TX time-difference.

4. The method according to claim 3, wherein the step of providing the calculated timing estimate comprises sending the calculated timing estimate to the second node for use by the second node to determine the geographical position related information.

5. The method according to claim 1, wherein the step of providing the calculated timing estimate comprises sending the calculated timing estimate to a positioning node for use by the positioning node to determine the geographical position related information.

6. The method according to claim 1, wherein the signal received from the second node has constant magnitude across allocated frequencies at least in the allocated subcarriers at a transmitter of the second node.

7. The method according to claim 1, wherein the signal received from the second node comprises at least one signal type from the following group: a reference signal, a random access signal, a synchronization signal.

8. The method according to claim 7, wherein the signal received from the second node is a demodulation reference signal or a sounding reference signal.

9. The method according to claim 1, wherein the first node comprises a base station and the second node comprises a user equipment, and wherein using the circular correlator comprises using the circular correlator to calculate a periodic auto-correlation function.

10. The method according to claim 1, wherein the first node comprises a user equipment and the second node comprises a base station, and wherein using the circular correlator comprises using the circular correlator to calculate a periodic auto-correlation function.

11. An electronic arrangement in a first node for providing geographical position related information, the first node and a second node are comprised within a wireless communication system and adapted to exchange wireless signals, the arrangement comprises:

a receiving unit adapted to receive a signal from the second node;

a sending unit adapted to transmit the geographical position related information to the second node;

a detecting unit adapted to use a circular correlator to detect a part of the received signal that has propagated through a channel path from the second node;

a calculation unit adapted to calculate a timing estimate associated with the propagation time of the part of the signal which is received through the channel path from the second node; and a providing unit adapted to provide the calculated timing estimate for use when determining a geographic position of the first node or the second node, wherein the first and second nodes comprise a base station and a user equipment, respectively, or comprise the user equipment and the base station, respectively, wherein the receiving unit is adapted to receive radio fingerprint measurement data from the user equipment at the base station after the providing unit provides the calculated timing estimate, wherein the sending unit is adapted to transmit the geographical position related information from the base station to the user equipment after the receiving unit receives the radio fingerprint measurement data from the user equipment, and wherein the geographical position related information is based on the radio fingerprint measurement data and is indicative of the geographic position of the user equipment.

12. The electronic arrangement of claim 11, wherein:
the providing unit is further adapted to communicate the calculated timing estimate to the second node for use by the second node to determine the geographical position related information.

13. The electronic arrangement of claim 12, wherein:
the calculated timing estimate comprises at least one of the following parameters:
Time of arrival, Time of arrival time-difference, Round Trip Time, one way signal propagation delay, User Equipment RX-TX time-difference.

14. The electronic arrangement of claim 11, wherein:
the calculation unit is configured to calculate the timing estimate responsive to a constant magnitude signal received from the second node via the receiving unit across allocated frequencies at least in the allocated subcarriers at a transmitter of the second node.

15. The electronic arrangement of claim 11, wherein:
the signal received by the receiving unit comprises at least one signal type from the following group: a reference signal, a random access signal, a synchronization signal.

16. The electronic arrangement of claim 15, wherein:
the signal received by the receiving unit is a demodulation reference signal or a sounding reference signal.

17. The electronic arrangement of claim 11, wherein:
the first node comprises a base station and the second node comprises a user equipment.

18. The electronic arrangement of claim 11, wherein:
the first node comprises a user equipment and the second node comprises a base station.

* * * * *